United States Patent [19]
Collins, Jr. et al.

[11] Patent Number: 6,076,724
[45] Date of Patent: Jun. 20, 2000

[54] PIPE CLAMP HAVING CABLE CONNECTED CLAMP MEMBERS

[75] Inventors: Robert H. Collins, Jr., Houston; James E. Helmick, Conroe, both of Tex.

[73] Assignee: Sumner Manufacturing Co., Inc., Houston, Tex.

[21] Appl. No.: 09/347,394

[22] Filed: Jul. 6, 1999

Related U.S. Application Data

[60] Provisional application No. 60/091,933, Jul. 7, 1998.

[51] Int. Cl.[7] ............................ B21D 21/00; B21D 35/00; B23K 31/02; B23K 5/22
[52] U.S. Cl. ............................................................ 228/44.3
[58] Field of Search ............................ 228/114.5, 141.1, 228/178, 212, 213, 44.3, 44.5, 45, 49.1, 49.3, 194; 269/43, 130, 132; 29/272, 281.5; 219/158, 161, 62; 24/200, 280

[56] References Cited

U.S. PATENT DOCUMENTS

| | | | |
|---|---|---|---|
| 3,422,519 | 1/1969 | Fehlman | 29/200 |
| 3,512,229 | 5/1970 | Phariss | 24/280 |
| 3,593,402 | 7/1971 | Mori | 29/200 P |
| 3,722,038 | 3/1973 | Arntz et al. | 24/81 PE |
| 3,934,615 | 1/1976 | Mertens | 24/249 |
| 4,356,615 | 11/1982 | Dearman | 29/525 |
| 4,475,726 | 11/1984 | Smith | 269/41 |
| 4,623,085 | 11/1986 | Dearman | 228/49.3 |
| 4,726,575 | 2/1988 | Dearman | 269/43 |
| 4,815,719 | 3/1989 | Peters et al. | 269/130 |
| 4,934,673 | 6/1990 | Bahler | 269/43 |

*Primary Examiner*—Patrick Ryan
*Assistant Examiner*—Zidia J. Pittman
*Attorney, Agent, or Firm*—James L. Jackson; Mayor, Day, Caldwell & Keeton LLP.

[57] ABSTRACT

An elongate flexible clamp mechanism defines first and second ends and is capable of assume a substantially flat configuration and is capable of being positioned in encircling relation about a cylindrical object such as a pipe. A pair of elongate flexible members such as wire cables, chains or pivotally interconnected rigid members support a plurality of substantially rigid clamping members in spaced relation along the lengths of said elongate flexible members. The clamping members are each provided with jack screws for force applying engagement with the pipe to enable alignment of adjacent pipe sections and to correct minor irregularities in pipe roundness so that adjacent pipe sections can be efficiently welded. The elongate flexible clamp mechanism is provided with first and second latch connector elements which are interconnected when the clamp mechanism is located in encircling relation about the pipe. The latch mechanism is of the cam or toggle type, enabling the clamp mechanism to be tightened about the pipe. Jack screws are also provided on each of the clamping elements to permit jacking force to be applied to the pipe for optimum pipe alignment and for correction of minor irregularities in pipe roundness.

18 Claims, 3 Drawing Sheets

PIPE CLAMP HAVING CABLE CONNECTED CLAMP MEMBERS

Applicants hereby claim the benefit of U.S. Provisional Application Ser. No. 60/091,933, filed on Jul. 7, 1998 by Robert H. Collins, Jr. and James E. Helmick and entitled Pipe Clamp Having Connected Clamp Members, which Provisional Application is incorporated by reference herein for all purposes.

BACKGROUND OF THE INVENTION

1. Field of the Invention

This invention relates generally to pipe clamp apparatus for clamping cylindrical members such as pipe sections typically to enable welded connection of the cylindrical members. More particularly, present invention is directed to a clamp mechanism for cylindrical objects which is capable of clamping both regular and irregular shapes together and being adjustable to allow for manufacturing tolerances of the cylindrical objects being clamped and to accommodate cylindrical objects of a wide range of sizes. Even more particularly, the present invention concerns pipe clamp apparatus having a plurality of clamp members for engaging cylindrical objects to be clamped and incorporating flexible connectors such as cables, chains or pivotally connected rigid elements for interconnecting and maintaining desired spacing of the clamping members. This invention also involves pipe clamping apparatus incorporating an adjustable latch mechanism for securing the clamp about the cylindrical objects sufficiently tight to maintain the objects in aligned registry for welding or for other suitable activities.

2. Description of the Prior Art

In a construction industry, pipe clamp apparatus has been widely used for many years for the purpose of aligning the ends of pipes to be welded so that the pipes are concentrically arranged with the ends thereof properly spaced so that the pipe sections can be welded together. A wide variety of typically rigid pipe clamp apparatus has been developed and utilized to accomplish clamping of pipes in alignment. In most cases the pipe clamping apparatus, especially for aligning and clamping large pipes, is of rigid design and is quite heavy and cumbersome and cannot be carried, installed or removed by a single individual. Typically commercially available pipe clamp apparatus is designed with two pivotally connected rigid clamp sections. Each of the clamp sections incorporates a number of adjustable, pipe engaging elements which must be independently adjusted for clamping pipe members of a particular dimension. If the pipe members are not of identically the same dimension, due to manufacturing tolerances for example, the pipe clamp apparatus may be subject to significant adjustment to enable the pipe sections to be positioned in sufficiently close alignment that adequate welding operations can be conducted.

Under circumstances where pipe sections are intended to be cylindrical, but are somewhat misshapen due to manufacturing tolerances, manufacturing problems, etc., typical commercially available pipe clamp apparatus is not ordinarily capable of conforming misshapen pipe to a cylindrical configuration to enable its efficient welding. Typically, commercially available pipe clamp apparatus is not provided with the capability for correcting the roundness of misshapen pipe. Rather these pipe clamps merely engage each of the sections of pipe to be aligned and position the ends of the pipe sections in as close alignment as possible. Consequently, if adjacent sections of pipe can not be properly aligned because one pipe section may be somewhat misshapened, the misshapened pipe or pipes must first be corrected to achieve proper roundness before pipe alignment and welding can occur. Accordingly, it is desirable to provide pipe clamp apparatus having the capability for correcting minor defects in the roundness of pipe and for insuring precision alignment of the ends of pipe sections to permit effective welded connection thereof.

Most commercially available pipe clamp apparatus, especially for clamping large pipe sections, is quite large and cumbersome. When such pipe clamping apparatus is not being used, it is often difficult to store and handle. Accordingly, it is desirable to provide pipe clamp apparatus that can be handled by a single individual and, when storage is necessary, the pipe clamp apparatus will fit within a small storage area thereby making it efficient to utilize, handle and store.

Another problem that is typical with commercially available pipe clamping apparatus is that most pipe clamps will handle only a very limited range of pipe sizes. For this reason, when a wide variety of pipe sizes are being aligned and welded is often necessary to maintain an inventory of pipe clamp apparatus, each being capable of handling only a narrow range of pipe sizes. This inventory requirement however adds significant cost to overall construction operations. Accordingly, it is desirable to provide pipe clamping apparatus having the capability for clamping a wide variety of pipe sizes thereby enabling inventory requirements for pipe clamp apparatus to be limited.

Another problem that is typical of commercially available pipe clamp apparatus is that the rigid pipe clamp sections that are typically used and the various adjustment mechanisms that are incorporated within each of the pipe sections results in the pipe joint to be welded being somewhat hidden by the pipe clamp apparatus. This can require repositioning of pipe clamp apparatus a number of times during each welding operation. This problem significantly adds to the labor costs of the welding operation and therefore is detrimental to overall construction costs. It is desirable therefor to provide pipe clamp apparatus that is of simple construction and when in position to properly orient adjacent pipe sections, permits virtually all of the pipe joint to be readily accessible for welding operations.

SUMMARY OF THE INVENTION

It is a principle feature of the present invention to provide novel pipe clamp apparatus which can be efficiently handled by a single individual and also provides a better means for clamping tubular sections together for welding;

It is another feature of the present invention to provide a novel light weight pipe clamp that can be carried and used by a single individual and can be efficiently stored in a small storage area when its use is not needed;

It is also an object of the present invention to provide a novel pipe clamp apparatus having the capability of correcting and aligning misshapen tubular sections through the use of jacking screws so that the ends of the pipe section will fit together precisely;

It is an even further feature of the present invention to provide a novel pipe clamp apparatus which, when assembled to adjacent pipe sections, accomplishes accurate alignment of the pipe sections for welding and also allows access to the welding area to permit efficient welding of the pipe sections while the clamp is installed;

It is another feature of the present invention to provide pipe clamp apparatus having a modularized design to minimize the number of total parts that form the pipe clamp apparatus; and It is yet another object of the present invention to provide novel pipe clamp apparatus that can be easily stored when not in use and can be stored in flat condition or in rolled up condition depending upon the configuration of the storage space that is available.

Briefly, the various objects and features of the present invention are realized through the provision of pipe clamp apparatus having a parality of pipe clamp elements of rigid construction and which are shaped intermediate the extremities thereof to provide for clearance of the pipe clamp elements with the pipe joint to be welded. The pipe clamping elements are maintained in suitably spaced relation by set screws at each end thereof which engage respective ones of a pair of elongate flexible members, which are preferably defined by flexible cables, but which may conveniently take the form of chain elements or segmented pivotally connected elements within the spirit and scope of the present invention. The pipe clamping elements and cable or flexible elements are assembled to define and elongate flexible pipe clamp assembly which is wrapped about cylindrical objects such as pipes. At one end of the pipe clamp apparatus, one of the clamp elements is provided with a pair of connection hooks. At the opposite end of the elongate pipe clamp apparatus another of the clamping elements is provided with an over-center, cam type or toggle type latch mechanism. The latch mechanism incorporates a clamp connection element having a transverse draw bar that is connected thereto by an adjustment mechanism such as a screw type adjustment. The cam latch mechanism is also provided with a removable latch handle which may be removed after the clamp assembly has been installed to prevent the handle from interfering with welding operations at the pipe joint being welded. The toggle or cam type latch mechanism will apply sufficient force through the flexible cables to the pipe so that minor irregularities in pipe configuration is corrected to permit optimum welded connection thereof. In larger sizes the pipe clamp mechanism may be provided with more than two flexible cables or connectors to provide for sufficient application of force to maintain pipe sections in alignment and to correct minor deficiencies of pipe configuration. Additionally, the pipe clamp apparatus may incorporate other force applying mechanisms such as hydraulic, pneumatic and electrically operated systems for force application.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an isometric illustration of a pipe clamping apparatus constructed in accordance with the principles of the present invention and representing the preferred embodiment of the invention;

FIG. 2 is an elevational view showing the pipe clamping apparatus of FIG. 1, disposed in encircling relation about a pipe or other cylindrical member;

FIG. 3 is a partial plan view illustrating the connection and latching mechanism of the pipe clamping apparatus of FIGS. 1 and 2;

FIG. 4 is a partial elevational view showing a pipe clamping apparatus representing an alternative embodiment of the present invention and having parts thereof shown in section;

Figure 5:
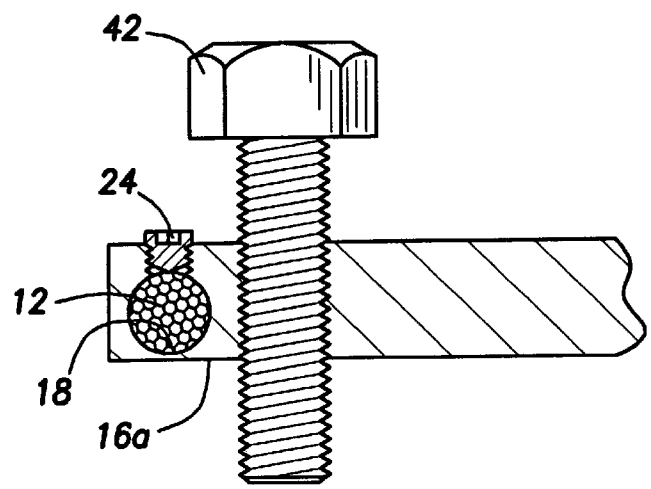
Figure 6:
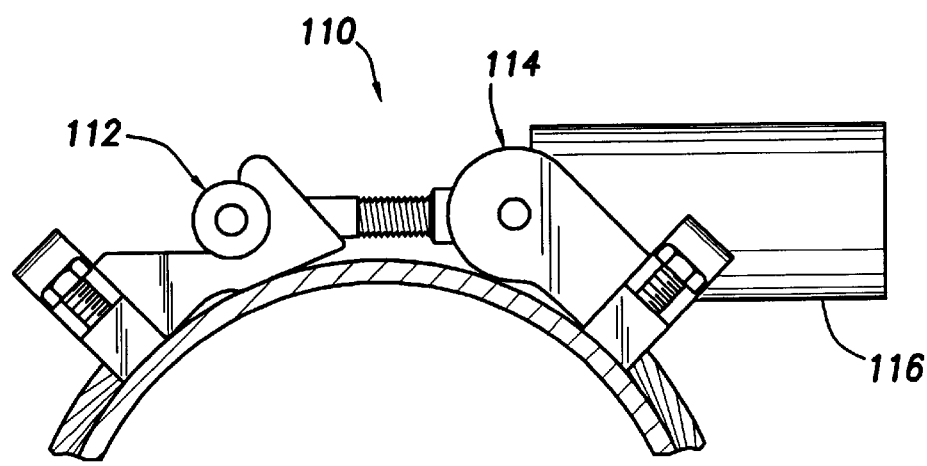

FIG. 5 is an elevational view showing a pipe clamping element of straight configuration representing a further alternative embodiment of the present invention; and FIG. 6 is a fragmentary elevational view showing the latching portion of pipe clamping apparatus representing an alternative embodiment of the present invention and having a power energized mechanism for application of latching actuation thereof and which may be of a hydraulic, pneumatic or electrically operated type.

DETAILED DESCRIPTION OF PREFERRED EMBODIMENT

Figure 1:
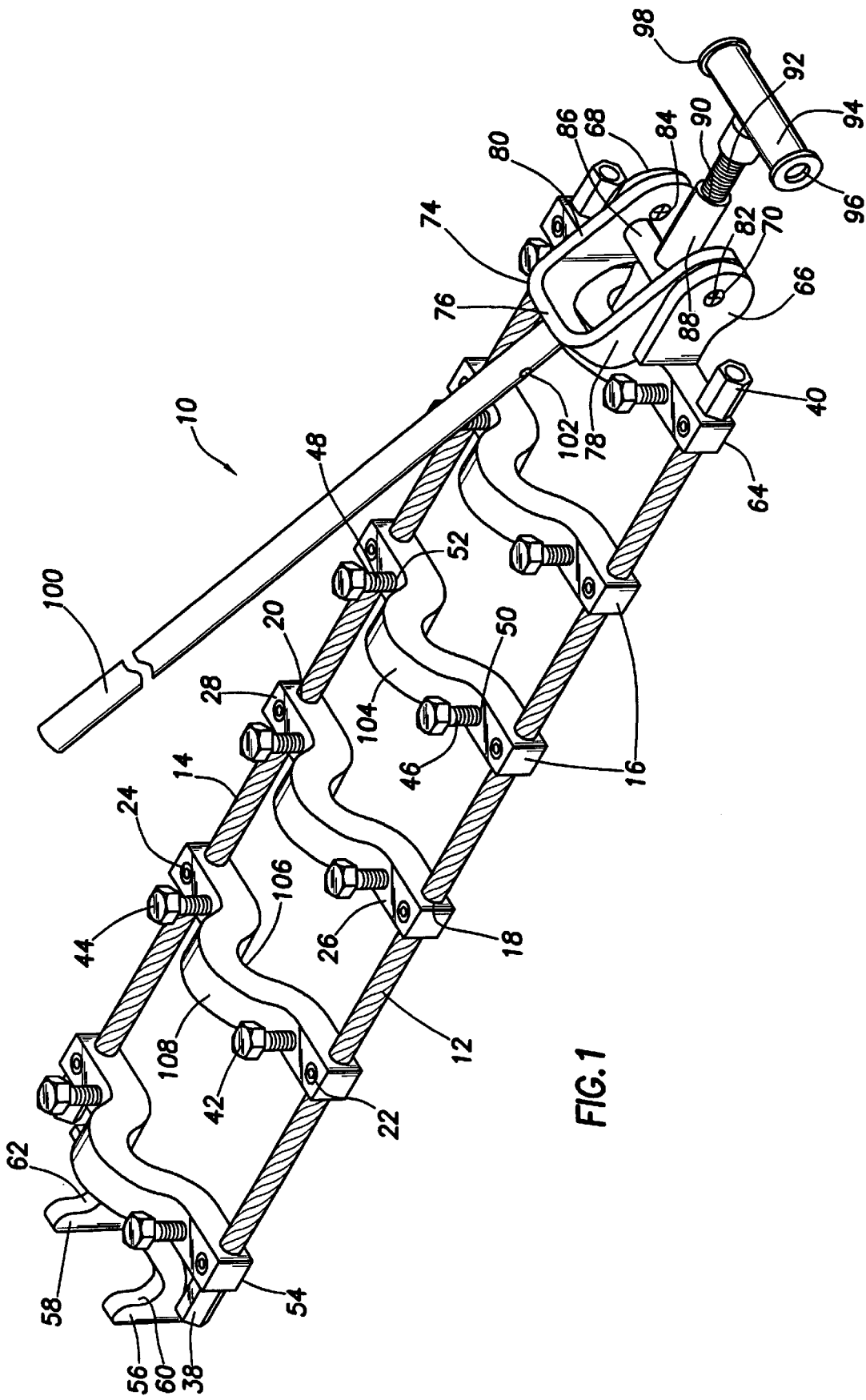
Figure 4:
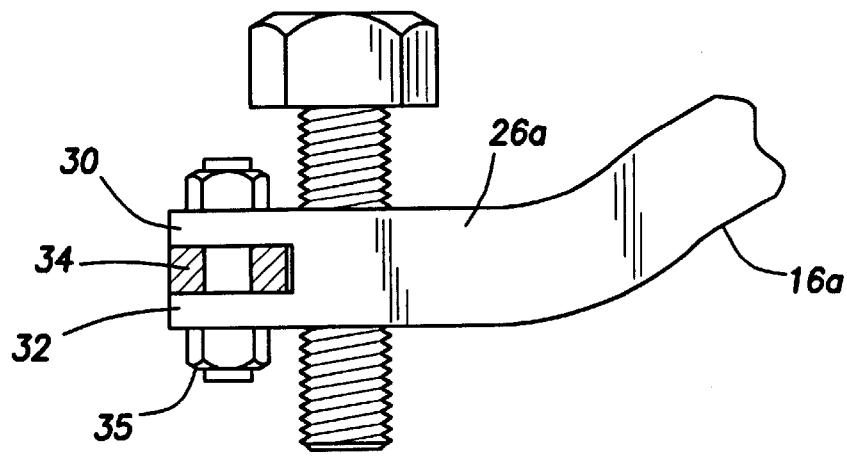

Referring now to the drawings and first to FIG. 1 a flexible pipe clamp constructed in accordance with the principles of the present invention is shown generally at 10 and incorporates a pair of flexible elements 12 and 14 which preferably take the form of flexible wire cable members. It should be borne in mind that the flexible elements may also be defined by interconnected chain links or pivotally interconnected sections of rigid material. It also should be borne in mind that for particularly large pipe sizes the flexible elements 12 and 14 may be defined by two or more flexible elements thereby permitting application of sufficient clamping force to the external surface of the pipe or other cylindrical elements so as to correct minor irregularities in roundness. This feature enables adjacent pipe sections to be positioned in precise registry for welded interconnection thereof. A plurality of pipe clamping elements 16 are located in suitably spaced relation along the flexible cables 12 and 14. In accordance with the preferred embodiment of the present invention, each of the pipe clamping elements 16 defines openings or passages 18 and 20 at respective end sections thereof through which the elongate flexible cables extend. Set screws 22 and 24 are received within internally threaded receptacles of the respective end sections 26 and 28 of the pipe clamping elements and are tightened into forcible engagement with the flexible cables within the apertures or passages 18 and 20 to thereby secure the pipe clamping elements to the flexible cables. Although the structural relationship of the flexible cables and pipe clamping elements is preferred as shown in the drawings, it should be borne in mind that any suitable manner of connection of a plurality of pipe clamping elements and spaced location along the length of the flexible elements is within the spirit and scope of the present invention. For example, as shown in FIG. 4 the pipe clamping elements 16a may define in sections 26a having spaced tabs or flanges 30 and 32. A flexible connector element 34 may be positioned with a portion thereof interposed between the tabs or flanges 30 and 32. Nut and bolt assemblies 35 which extend through apertures in the tabs or flanges 30 and 32 may be employed to establish interconnection between the pipe clamping elements and the flexible elements. Various other means of connecting the pipe clamping elements with the flexible elements may also be employed without departing from the spirit and scope of this invention.

Where flexible cable is employed as the flexible members of the pipe clamp mechanism the ends of the flexible cables may be provided with steel ferrules 38 and 40 which maintain the pipe clamping elements in assembly with the flexible cables even under circumstances where the set screws 22 may not be tightened. This feature enables the pipe clamping elements to be adjusted as to spacing after the pipe clamp apparatus has been assembled but not tightened about the pipe sections to be welded. Thus, the pipe clamping elements can be positioned to suit the needs of the user, after which they may be tightened with respect to the flexible elements 12 and 14 simply by tightening the set screws 22 and 24 of each of the pipe clamping elements.

Each of the pipe clamping elements 16 is provided with a pair of jack screws such as shown at 42 and 44, which define externally threaded sections 46 and 48, being received within respective internally threaded openings 50 and 52 of the pipe clamping elements. After the pipe clamping apparatus has been placed in encircled and latched relation about the pipe sections to be welded, the jack screw elements 42 and 44 may be adjusted to apply jacking force to the external surface of the pipe. If the pipe is slightly out of round the jack screws will be capable of applying sufficient force to the pipe to render it perfectly cylindrical. Thus, the pipe clamp apparatus 10 is capable of being utilized not only to align the ends of the pipe sections in proper position for welding, but also to correct minor pipe configuration irregularities. This feature enables adjacent pipe sections to be welded in optimum manner.

In order to secure the pipe clamping apparatus 10 about the pipe, a connection and latch mechanism is employed. An end-most pipe-clamping element shown at 54 is provided with a pair of connection projections 56 and 58, which extend from the pipe clamping elements 54 and are configured to define hook receptacles 60 and 62. At the opposite end of the pipe clamping apparatus 10, the end-most pipe-clamping element 64 is provided with a pair of spaced-hinge projections 66 and 68, which define pivot openings 70 and 72, respectively. A cam-latch element 74 is provided, having a transverse connecting section 76 from which extends a pair of spaced-latch projections 78 and 80, which are connected to the hinge projections 66 and 68 by respective pivot members 82 and 84.

A transverse force transmitting member 86 is pivotally interconnected with each of the latch projections 78 and 80 at a location offset from the pivot elements 82 and 84. A clamp-connection element 88 is fixed to the transverse force transmitting element 86 at a location intermediate the ends thereof and defines an internally-threaded receptacle 90, which receives a threaded adjustment section 92 of a transverse draw bar member 94. The draw bar member 94 is of a dimension and configuration for being received in interfitting relation within the hook-like receptacles 60 and 62 of the connector hook members 56 and 58 when the pipe clamp mechanism 10 is positioned about a pipe or other cylindrical object 96. To ensure against lateral misalignment of the transverse draw bar member 94 with respect to the hook receptacles 60 and 62, the draw bar member 94 is provided with a pair of circular end flanges 96 and 98. These end flanges, when the draw bar member 94 is fully engaged within the hook receptacles 60 and 62, will overlie the outside surfaces of the respective hook connector elements 56 and 58. This feature prevents the draw bar from moving laterally with respect to the hook connectors and ensures that the latch connection will remain in secure assembly even when lateral forces may be applied thereto. The cam or toggle latch 74 is also provided with a removable actuating handle 100, which is secured to the latch connector by a releasable connector element 102. Thus, after the pipe clamp assembly has been suitably located with respect to the pipe, and the latch mechanism has been actuated to suit the intent of the user, the latch handle 100 may be released and removed from the cam latch 74 so that the latch handle will not interfere with access by the welder to the pipe joint being welded. This feature also prevents the latch from being inadvertently released while welding operations are in progress.

To further assist the welder with efficient access to the pipe joint being welded, each of the pipe clamping elements 16, including the end pipe clamping elements 54 and 64 configured with an intermediate bend as shown at 104 to provide a region of clearance 106 of the intermediate portion 108 of each of the pipe clamping elements with respect to the pipe joint being welded.

Referring particularly to FIG. 5, it is intended within the sprit and scope of the present invention to provide a flexible pipe clamping mechanism which incorporates a plurality of substantially rigid clamping elements 16a of substantially straight configuration, assuming that the individual clamping elements have sufficient stand-off from the pipe being welded that the intermediate portions of the clamping elements do not interfere with welding of the girth joint weld connection that is typical for pipe joints.

Referring to FIG. 6, though the present invention is described herein particularly as it relates to mechanical, toggle or cam actuated latch mechanisms for securing the pipe clamping apparatus about the pipe to be welded or the cylindrical objects to be aligned, such is not intended to limit the spirit and scope of the present invention. As shown in FIG. 6, a power energized pipe clamp actuating mechanism is depicted generally at 110 having first and second connector devices 112 and 114 respectively, which are actuated by a power actuated mechanism shown at 116. The power actuated mechanism shown at 116 may conveniently take the form of a hydraulically energized latch actuator, a pneumatically energized latch actuator or an electrically energized latch actuator.

OPERATION

Figure 2:
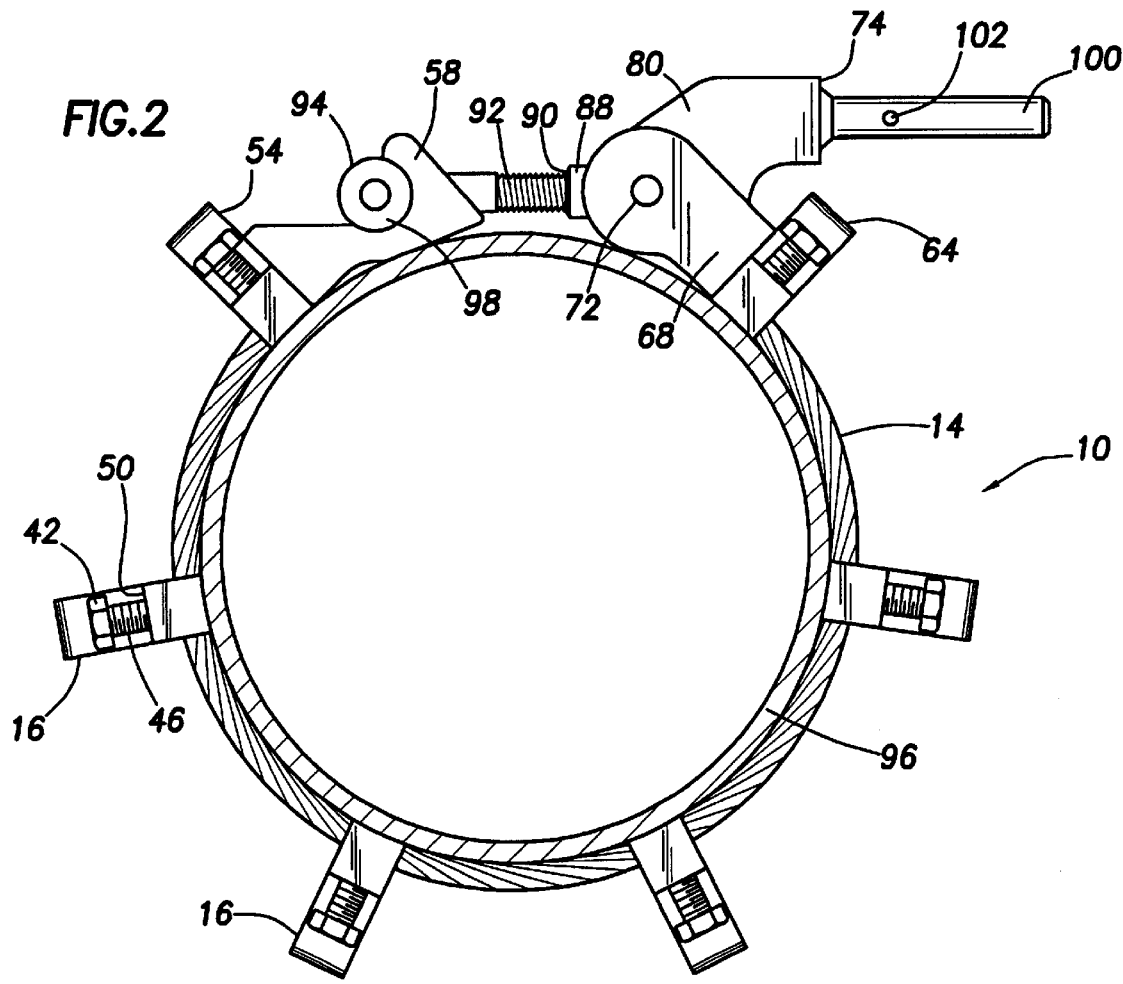
Figure 3:
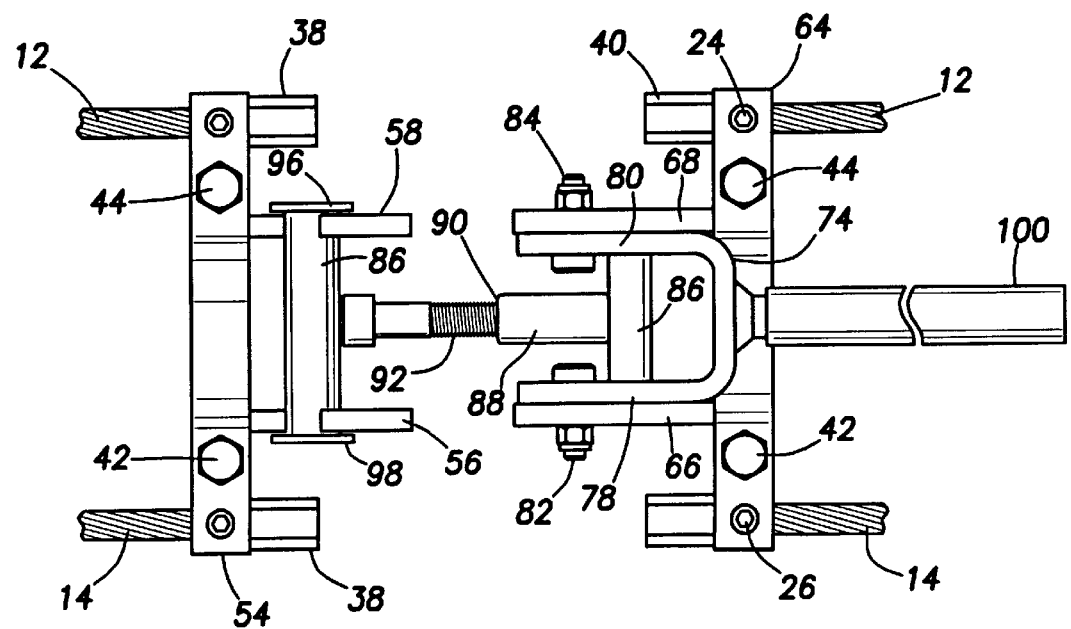

A pair of pipe sections 96 are positioned so that the respective ends thereof are somewhat properly spaced end to end. Typically, the pipe sections will be supported by pipe jacks so that the respective circular ends of the pipe, which are typically bevelled for welding, are positioned in substantially coaxial relation. With the cam latch 74 at its unlatched and fully open position, the pipe clamp apparatus 10 is positioned in encircling relation about the pipe 96 as shown in FIG. 2, and the transverse draw bar member 94 is positioned in engagement with the respective hook receptacles 60 and 62 of the connector projections 56 and 58 essentially as shown in FIG. 2. The cam or toggle latch 76 is then actuated by pivoting of the latch handle 100 toward the over-center or closed position of the latch mechanism, thereby forcing the flexible cables tightly about the outer surface of the pipe 96. If the latch mechanism is fully latched and the flexible cable elements 12 and 14 are loose with respect to the pipe 96, this looseness may be eliminated by releasing the latch mechanism to its fully open position and by adjusting the position of the draw bar 94 with respect to its transverse force transmitting pivot element 86 by adjusting the threaded section 92 with respect to the internally threaded receptacle 90 of the clamp connector element 88. With this adjustment properly made, pivoting of the cam or toggle latch 74 to the fully latched position thereof will cause the pipe clamping elements 16 and the flexible cable sections 12 and 14 to tightly engage the outer surface of the pipe 96. If the pipe is relatively thin-walled pipe, the force that is applied by moving the toggle linkage of the latch mechanism over-center, can force the flexible cable sections 12 and 14 against the outer surface of the pipe with sufficient force to correct any out-of-round imperfection of the pipe. When the pipe 96 is of relatively thick-walled character, any out-of-round imperfections thereof may be corrected by controlled tightening of the respective jack screws 42–4 so that jack screw forces can be applied in controlled fashion to outer surface sections of the pipe to yield the pipe and to render it perfectly round. Since each of the pipe clamping elements 16 is provided with jack screws on opposite sides thereof, the jack screws on one side of each of the pipe clamp elements will engage the end portion of one section of pipe, while the jack screws on the opposite of each of the pipe clamp elements will engage the end section of the adjacent section of pipe. Thus, by manipulation of the jack screws of each of the clamping elements in controlled fashion, both of the ends of the pipe sections may be rendered perfectly round and may be brought into precise circular registry. When this is done and with the pipe sections properly spaced, a welded joint may be easily formed, thereby properly interconnecting the pipe sections. It will not be difficult for welding personnel to quickly learn to adjust the jack screws of each of the clamp members so as to precisely align the ends of the pipe sections for efficient welding operations. Since the intermediate section of each of the pipe-clamping elements is bent to define relief from the pipe joint being welded, the pipe joint to be welded will be readily accessible for efficient welding operations.

Although the pipe clamping mechanism 10 as shown in FIG. 1 is provided with only a pair of flexible cables 12 and 14, such is not intended to be restrictive of the spirit and scope of the present invention. For larger pipe sizes to thus enable application of greater force to the outer surfaces of adjacent pipe sections, each of the pipe-clamping elements 16 may be provided with two or more flexible elements which may be cables, chains or pivotally interconnected rigid elements. In such case, each of the pipe-clamping elements maybe provided with two or more jack screws such as shown at 42 and 44 to thus enable the user to apply sufficient force to the outer surfaces of the pipe to position the ends of the pipe in precise registry for welding and to correct any out-of-round imperfections of the pipe sections.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

What is claimed is:

1. A flexible clamp mechanism defining first and second ends and adapted to assume a substantially flat configuration and to be positioned in encircling relation about a cylindrical object, comprising:

(a) at least two flexible wire cable members each having first and second ends and being disposed in spaced relation;

(b) a plurality of substantially rigid clamping members each having ends being in assembly with each of said flexible wire cable members and being disposed in spaced relation along the lengths of said flexible wire cable members;

(c) a first latch connector being provided at said first end of said flexible wire cable members;

(d) a second latch connector being provided at said second end of said flexible wire cable members and adapted for force transmitting latching interconnection with said first latch connector; and (e) said second latch connector being actuated to apply force to said first latch connector to urge said first and second ends of said flexible wire cable members toward one another and tighten said flexible clamp mechanism about the cylindrical object.

2. A flexible clamp mechanism defining first and second ends and adapted to assume a substantially flat configuration and to be positioned in encircling relation about a cylindrical object, comprising:

(a) at least two flexible wire cable members each having first and second ends and being disposed in spaced relation;

(b) a plurality of substantially rigid clamping members each having ends being in assembly with each of said flexible wire cable members and being disposed in spaced relation along the lengths of said flexible members;

(c) a first latch connector being provided at said first end of said flexible members;

(d) a second latch connector being provided at said second end of said flexible members and adapted for force transmitting latching interconnection with said first latch connector; and (f) said second latch connector element having a power energized actuator for tightening said flexible clamp mechanism in encircling relation about the cylindrical object.

3. The flexible clamp mechanism of claim 1, comprising:

(a) the cylindrical object being a pipe section positioned adjacent another pipe section to define a pipe joint and intended for welded assembly; and (b) each of said substantially rigid clamping members being configured intermediate the extremities thereof to define a relief area permitting welding access to the pipe joint to be welded.

4. The flexible clamp mechanism of claim 1, comprising: each of said substantially rigid clamping members being of substantially straight configuration.

5. The elongate flexible clamp mechanism of claim 1, comprising:

each of said substantially rigid clamping members having at least one jack screw located at each of said ends and having threaded engagement therewith and adapted for force transmitting engagement with cylindrical object arranged in substantially abutting relation.

6. The elongate flexible clamp mechanism of claim 1, comprising:

(a) said first latch connector defining a latch receptacle; and (b) said second latch connector having a latch element being pivotally movable and having a drawbar pivotally connected thereto for latching engagement with said latch receptacle of said first latch connector and upon pivotal movement thereof applying force to said drawbar for drawing said elongate flexible clamp mechanism tightly about the cylindrical object.

7. The elongate flexible clamp mechanism of claim 6, comprising:

(a) a pair of hinge projections extending from an endmost one of said clamping members and being disposed in spaced relation;

(b) said latch element being pivotally connected to said hinge projections and having a handle element for application of actuating force thereto;

(c) a drawbar connector element being pivotally connected to said latch element at a location offset from said pivotal connection of said latch element to said hinge projections and capable of being moved substantially linearly upon rotation of said latch element and capable of being moved to an over-center position with respect to the pivot of said latch for force transmitting latching with said first latch connector; and (d) said drawbar being connected to said drawbar connector and disposed for engagement within said receptacle of said first latch connector.

8. The elongate flexible clamp mechanism of claim 1, comprising:

(a) said second latch connector having a drawbar connector and a drawbar and being pivotally movable to impart force applying movement of said drawbar; and (b) said drawbar being adjustable relative to said drawbar connector to accommodate different sizes of cylindrical objects.

9. A flexible clamp mechanism defining first and second ends and adapted to assume a substantially flat configuration and to be positioned in encircling relation about a cylindrical object comprising:

(a) at least two flexible wire cable members each having first and second ends and being disposed in spaced relation;

(b) a plurality of substantially rigid clamping members each having ends being in assembly with each of said flexible wire cable members and being disposed in spaced relation along the lengths of said flexible members;

(c) a first latch connector being provided at said first end of said flexible members;

(c) a second latch connector being provided at said second end of said flexible members and adapted for force transmitting latching interconnection with said first latch connector;

(d) said second latch connector being actuated to apply force to said first latch connector to urge said first and second ends of said flexible members toward one another and tighten said flexible clamp mechanism about the cylindrical object;

(e) said clamping members defining connection receptacles adjacent each end thereof;

(f) said flexible wire cable members extending through said connection receptacles; and (g) locking elements being received by said clamping members and locking said clamping members at desired locations along the lengths of said wire cable members.

10. The flexible clamp mechanism of claim 1, comprising: said flexible clamp mechanism being of sufficiently lightweight construction to permit transport, installation and removal thereof by an individual.

11. The flexible clamp mechanism of claim 1, comprising: said at least two flexible wire cable members being two or more of said flexible wire cable members interconnected with each side of said plurality of rigid clamping members.

12. An flexible clamp mechanism defining first and second ends and adapted assume a substantially flat configuration and to be positioned in encircling relation about pipe sections intended for welded assembly, comprising:

(a) at least two flexible wire cable members each having first and second ends;

(b) a plurality of substantially rigid clamping members being in assembly with each of said flexible wire cable members and being disposed in spaced relation along the lengths thereof;

(c) at least one first latch connector being provided at said first end of said flexible clamp mechanism;

(d) at least one second latch connector being provided at said second end of said flexible clamp mechanism and adapted for force applying latching interconnection with said first latch connector; and (e) at least two jack elements being provided on each of said plurality of substantially rigid clamping members and being actuatable for clamping engagement with each pipe section and for application of sufficient force against either of said pipe sections for precise positioning of said pipe sections for welding and for correcting minor roundness irregularities of either of said pipe sections.

13. The flexible clamp mechanism of claim 12, comprising:

said second latch connector being actuatable to apply force between said first and second latch connectors to tighten said flexible clamp mechanism in encircling relation about the pipe sections.

14. The flexible clamp mechanism of claim 12, comprising:

said first and second latch connector elements having a power energized actuator for tightening said flexible clamp mechanism in encircling relation about said pipe sections.

15. The flexible clamp mechanism of claim 12, comprising:

each of said clamping members being configured intermediate the extremities thereof to define a relief area permitting welding access to the pipe joint to be welded.

16. The flexible clamp mechanism of claim 12, comprising:

said jack elements being at least two jack screws having threaded engagement with each of said clamping members and adapted for force transmitting engagement with respective pipe sections.

17. The flexible clamp mechanism of claim 12, comprising:

(a) said first latch connector defining at least one connector receptacle; and (b) said second latch connector being a force applying mechanism for latching engagement with said connector receptacle of said first latch connector and for drawing said flexible clamp mechanism tightly about the pipe sections.

18. The flexible clamp mechanism of claim 17, comprising:

(a) a pair of hinge projections extending from an endmost one of said clamping members and being disposed in spaced relation;

(b) said force applying mechanism having a latch element pivotally connected to said hinge projections and having a handle element for application of actuating force thereto;

(c) a force transmitting drawbar connector element being pivotally connected to said latch element at a location offset from said pivotal connection of said latch element to said hinge projections and capable of being moved substantially linearly upon rotation of said latch element and capable of being moved to an over-center position with respect to the pivotal connection of the latch element for latching; and (c) a drawbar being connected to said force transmitting drawbar connector and disposed for force transmitting engagement with said first latch connector.

* * * * *